(12) United States Patent
Lee et al.

(10) Patent No.: US 9,256,949 B2
(45) Date of Patent: Feb. 9, 2016

(54) REGION GROWING APPARATUS AND METHOD USING MULTI-CORE

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Sang-Heon Lee, Hwaseong-si (KR); Soo-Jung Ryu, Hwaseong-si (KR); Yeon-Gon Cho, Hwaseong-si (KR); Do-Hyun Kim, Seoul (KR); Yeong-Gil Shin, Seoul (KR); Byeong-Hun Lee, Bucheon-si (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 417 days.

(21) Appl. No.: 13/919,384

(22) Filed: Jun. 17, 2013

(65) Prior Publication Data
US 2013/0336587 A1 Dec. 19, 2013

(30) Foreign Application Priority Data
Jun. 15, 2012 (KR) .......... 10-2012-0064514

(51) Int. Cl.
*G06T 7/00* (2006.01)

(52) U.S. Cl.
CPC ..... *G06T 7/0081* (2013.01); *G06T 2207/10081* (2013.01)

(58) Field of Classification Search
USPC ....................................... 382/173
See application file for complete search history.

(56) References Cited

U.S. PATENT DOCUMENTS

| | | | |
|---|---|---|---|
| 6,064,391 A | 5/2000 | Sano et al. | |
| 6,912,467 B2 | 6/2005 | Schuette | |
| 6,987,883 B2* | 1/2006 | Lipton | G06T 7/0081 382/171 |
| 7,031,517 B1* | 4/2006 | Le | G06K 9/342 375/E7.13 |
| 7,187,800 B2 | 3/2007 | Hibbard | |
| 7,860,311 B2* | 12/2010 | Chen | G06K 9/00711 382/173 |
| 8,526,733 B2* | 9/2013 | Tilton | G06T 7/0081 382/173 |
| 8,655,093 B2* | 2/2014 | El Dokor | G06T 7/0081 382/103 |
| 8,705,866 B2* | 4/2014 | Zhang | G06K 9/00684 382/159 |
| 8,731,261 B2* | 5/2014 | Ghosh | G06T 7/0081 378/1 |
| 8,878,871 B2* | 11/2014 | Clark | G06T 17/05 345/419 |
| 8,942,445 B2* | 1/2015 | Foo | G06T 7/0081 382/128 |
| 2014/0146044 A1* | 5/2014 | Cvetko | G06T 19/003 345/420 |

* cited by examiner

*Primary Examiner* — Ishrat I Sherali
(74) *Attorney, Agent, or Firm* — Sughrue Mion, PLLC (57) ABSTRACT

A region growing apparatus using multi-core includes a plurality of cores, each core including an operation controller configured to perform an operation for region growing of a 2D pixel region or 3D pixel region and an inner memory configured to store a queue associated with a seed pixel as a target of the operation; and a shared memory connected to the plurality of cores over a network and shared by the plurality of cores.

18 Claims, 13 Drawing Sheets

REGION GROWING APPARATUS AND METHOD USING MULTI-CORE

CROSS-REFERENCE TO RELATED APPLICATION

This application claims priority from Korean Patent Application No. 10-2012-0064514, filed on Jun. 15, 2012, in the Korean Intellectual Property Office, the disclosure of which is incorporated herein by reference in its entirety.

BACKGROUND

1 Field

Methods and apparatuses consistent with exemplary embodiments relate to a region growing, and more particularly, to using multiple cores that are connected over a network and perform operations related to region growing in parallel.

2 Description of the Related Art

Region growing is an image segmentation method. It is also referred to as "seeded region growing" due to a characteristic of a region grown from a seed pixel.

The use of region growing is increasing, from two-dimensional (2D) images to three-dimensional (3D) volumetric images. For example, region growing is used to extract a region of interest for processing a specific area of a 2D image, or to extract a target object from a surveillance image. In medical imaging, region growing is utilized to extract an organ or a lesion of interest by setting a particular 3D pixel (also referred to as a "voxel") as a seed pixel (or voxel) in a 3D volumetric image captured by a computerized axial tomography (CAT).

Region growing is carried out by iteratively calculating property values of neighborhoods of a seed pixel or voxel, and including the neighborhood in a region containing the seed pixel, based on the calculated property values.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

In accordance with an aspect of an exemplary embodiment, there is provided a region growing apparatus using multi-core, the region growing apparatus including: a plurality of cores, each configured to include an operation controller to perform an operation for region growing with respect to a 2D or 3D pixel region and an inner memory configured to store a queue associated with a seed pixel as a target of the operation; and a shared memory connected to the plurality of cores over a network and shared by the plurality of cores.

The shared memory may be configured to include a core flag write area, to which a core flag is written to indicate an operation state of each of the plurality of cores, and a pixel flag write area, to which a pixel flag is written to indicate a processing state of individual pixels included in the pixel region.

Each of the plurality of cores may include a core flag writer configured to write the core flag to the core flag write area, corresponding to an operation state value of the core.

The operation state may be active state or idle state.

The core flag may be 1 or 0 wherein 1 corresponds to active state of the core and 0 corresponds to idle state of the core.

Each of the plurality of cores may be configured to include a pixel flag writer configured to write the pixel flag associated with each of the cores to the pixel flag write area.

The pixel flag may include a test bit value to indicate whether or not a pixel associated with the pixel flag is processed and an inclusion bit value to indicate whether the pixel meets region inclusion criteria of the operation for region growing.

The pixel flag writer included in each of the plurality of cores may set a test bit value of a pixel flag associated with at least one neighboring pixel of a seed pixel as 1 and the operation controller may perform the operation for region growing on the at least one neighboring pixel.

When the pixel on which the operation for region growing has been performed is included in a region of the seed pixel, the pixel flag writer may set an inclusion bit value of the pixel flag associated with the at least one neighboring pixel as 1, and input the neighboring pixel to a queue of another core.

The plurality of cores may end their jobs in response to operation state of all core flags in the core flag write area being idle.

A group of pixels having 1 as their inclusion bit value may become a result of the operation for region growing.

In accordance with an aspect of an exemplary embodiment, there is provided a region growing method using multi-core, the method including: writing core flags to a core flag write area of a shared memory to, respectively, indicate operation states of a plurality of cores; determining whether an operation for region growing has been performed on at least one neighboring pixel of a seed pixel that is input to a queue of a core in active state, among the plurality of cores, with reference to a test bit value of a pixel flag associated with each of the at least one neighboring pixel; in response to a determination being made that the operation for region growing has not been performed on the at least one neighboring pixel, changing the test bit value associated with the neighboring pixel; performing the operation for region growing to determine whether the at least one neighboring pixel is included in a region of the seed pixel; and writing a result of the operation for region growing to an inclusion bit value of the pixel flag associated with the at least one neighboring pixel.

The test bit value and the inclusion bit value of the pixel flag may be written to a pixel flag write area of the shared memory.

The writing of test bit value and the inclusion bit value may include, in response to at least one neighboring pixel, on which the operation for region growing has been performed, being included in the region of the seed pixel, writing 1 to the inclusion bit value associated with the at least one neighboring pixel and inputting the neighboring pixel to a queue of another core.

The region growing method may further include in response to the at least one neighboring pixel, on which the operation for region growing has been performed, being included in the region of the seed pixel, inputting each of the at least one neighboring pixel to a queue of other cores as a new seed pixel.

The region growing method may further include in response to the operation for region growing being performed on neighboring pixels of all seed pixels inputted to the queue of the core, changing a value of an operation state of a core flag associated with the core to a value corresponding to idle state.

The region growing method may further include in response to operation states of all other cores being determined as idle state with reference to the core flag write area, terminating a job of the core.

The region growing method may further include outputting a group of pixels having 1 as their inclusion bit values as a result of the operation for region growing.

BRIEF DESCRIPTION OF THE DRAWINGS

The above and/or other aspects will become more apparent by describing certain exemplary embodiments, with reference to the accompanying drawings, in which.

DETAILED DESCRIPTION

Certain exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

Hereinafter, the term pixel means pixel or voxel, unless otherwise noted.

Figure 1:
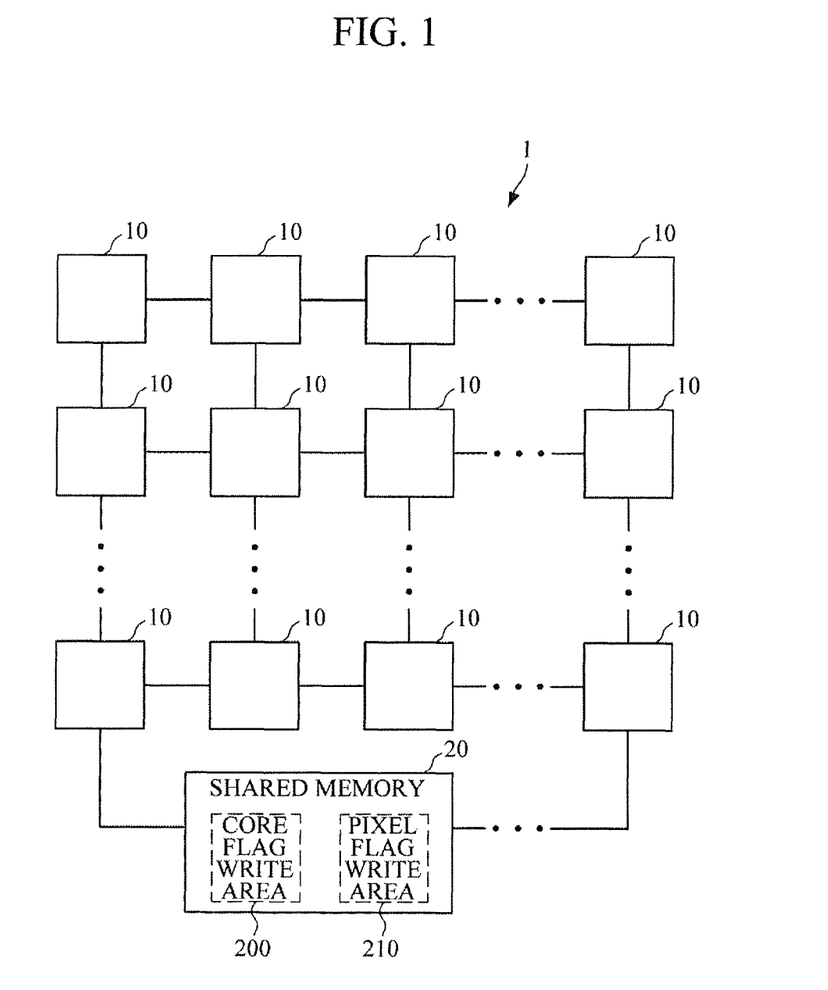
FIG. 1 is a diagram illustrating an example of a region growing apparatus according to an exemplary embodiment.

FIG. 1 is a diagram illustrating an example of a region growing apparatus.

Referring to FIG. 1, a region growing apparatus 1 includes a plurality of cores 10 and a shared memory 20 which is connected to the plurality of cores via a network.

Each of the cores 10 may perform an operation on neighboring pixels of a seed pixel of a 2D or a 3D pixel region, for region growing. In addition, each of the cores 10 may include a queue in its inner memory unit to store a job related to a new seed pixel(s) which is a target of the operation for region growing.

The shared memory 20 may be connected to the plurality of cores 10 via the network, and allow each core to write data to a dedicated area of the shared memory 20 or to read data written by another core.

The shared memory unit 20 may include a core flag write area 200 and a pixel flag write area 210.

Each of the cores 10 writes a core flag to the core flag write area 200 to indicate its operation state.

In addition, each core 10 that is processing a pixel (one of neighboring pixels of a seed pixel) writes a pixel flag to the pixel flag write area 210 to indicate a processing state of the pixel.

Connection between the cores 10 or between the cores 10 and the shared memory 20 may be established via a Network-on-chip (NoC) or a network.

Figure 2:
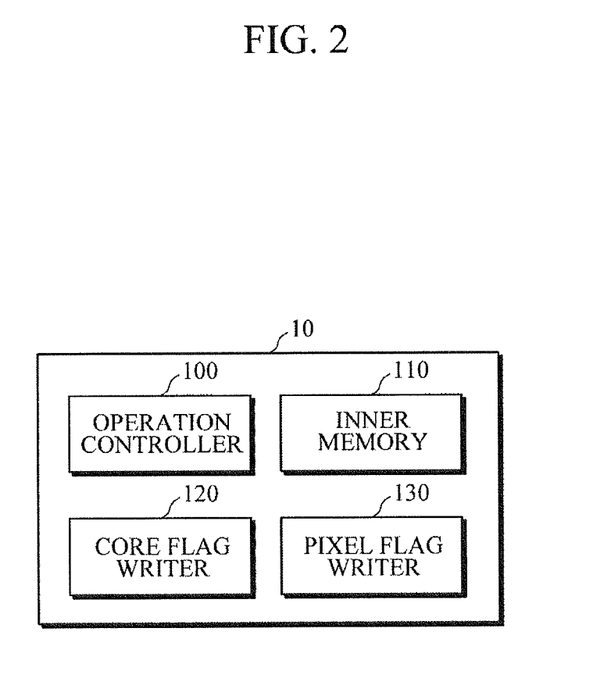
FIG. 2 is a diagram illustrating in detail one of the cores shown in FIG. 1 according to an exemplary embodiment.

FIG. 2 is a diagram illustrating in detail one of the cores shown in FIG. 1.

Referring to FIG. 2, the core 10 may include an operation unit controller 100, an inner memory 110, a core flag writer 120, and a pixel flag writer 130.

The operation controller 100 performs an operation to determine whether each of neighboring pixels of an initial seed pixel is included in a region containing the seed pixel.

For example, property values of pixels as targets of an operation for region growing are used to determine whether each of the pixels is included in the region of the initial seed pixel.

Examples of representative methods of calculating property values of pixels may include an intensity method, a gradient method and a texture method.

The intensity method uses a unique property value of each pixel. The gradient method uses a gradient value between neighboring pixels, instead of the unique property values of each pixel.

The texture method utilizes characteristics of a pattern formed by a target pixel and its given neighbors.

Once the property value of the target pixel has been acquired by either (or any other) of the above methods, it is determined whether to add the pixel to the region of a seed pixel, based on the pixel property value. Such determination is made based upon a property difference or a property range method.

In a difference method, a target pixel is added to a region when a difference of a property value between the target pixel and a seed pixel is within a given range. In a range method, the addition of a target pixel into the region of the seed pixel is performed when a property value of the target pixel itself is within a predefined range.

Any appropriate methods of calculating a property value of a pixel and of determining the addition of a pixel may be applied to the operation controller 100.

In a 2D image, four pixels, including upper, lower, left and right pixels, around a seed pixel may be neighboring pixels. Alternatively, eight pixels, further including diagonally arranged pixels adjacent to the seed pixel, may be selected. In the case of a 3D voxels, it may be considered that there are 6-connected neighboring voxels or 26-connected neighboring voxels.

The inner memory 110 may generate a queue to store a job related to a new seed pixel which is a target of the operation. The inner memory 110 may be a scratch pad memory (SPM).

Each core 10 may further include other elements, such as data cache, instruction cache, DMA, and the like.

There may arise two problems while an operation of region growing is performed on a number of pixels in parallel. First, a number of cores may concurrently and redundantly perform the operation with respect to the same pixel. Second, even when a given core becomes empty and enters into idle state, another core may allocate a job to the core and the core may thereby switch to active state, which hampers the identification of the exact job end time.

In an exemplary embodiment, these problems may be overcome by use of the core flag writer 120, the pixel flag writer 130, the core flag write area 200 and the pixel flag write area 210.

The pixel flag writer 130 and the pixel flag write area 210 may be used to eliminate redundancy.

To prevent other cores from performing an operation on the same pixel on which the relevant operation has been completely performed, pixel flags are allocated to the respective pixels.

Figure 3A:
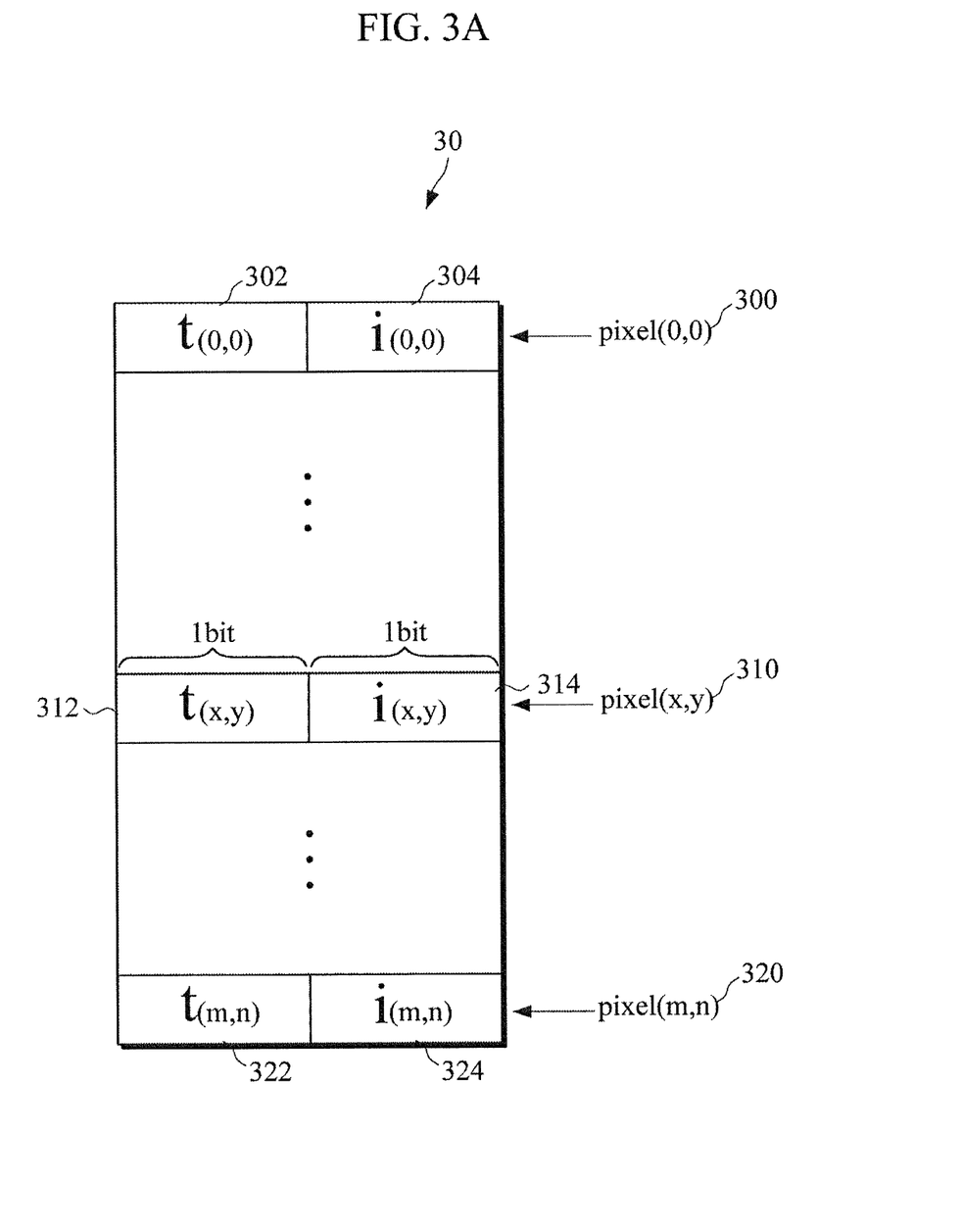
FIG. 3A is diagram illustrating an example of a pixel flag according to an exemplary embodiment.

FIG. 3A is diagram illustrating an example of a pixel flag.

Referring to FIG. 3A, the entire pixel area includes pixels arranged in (m+1) rows and (n+1) columns, and the coordinates of a target pixel, on which the operation is performed, are (x, y).

The pixel flag uses two bits for each pixel. A first bit 302, 312, and 322 of two bits of each pixel flag represents a test bit value that indicates whether the corresponding pixel 300, 310, and 320 has been tested to determine whether it is included in a region of a seed pixel. A second bit 304, 314, and 324 is an inclusion bit value that indicates whether the tested pixel is included in the region of the seed pixel.

For example, according to settings, test bit value 0 may represent that the corresponding pixel has not been tested and test bit value 1 may represent that the corresponding pixel has been tested.

For example, if a neighboring pixel (x, y) of a given pixel has test bit value 1 and inclusion bit value 0, it indicates that the pixel (x, y) has been tested, and thus not need to be tested any further, but is not included in the region of the seed pixel.

Figure 3B:
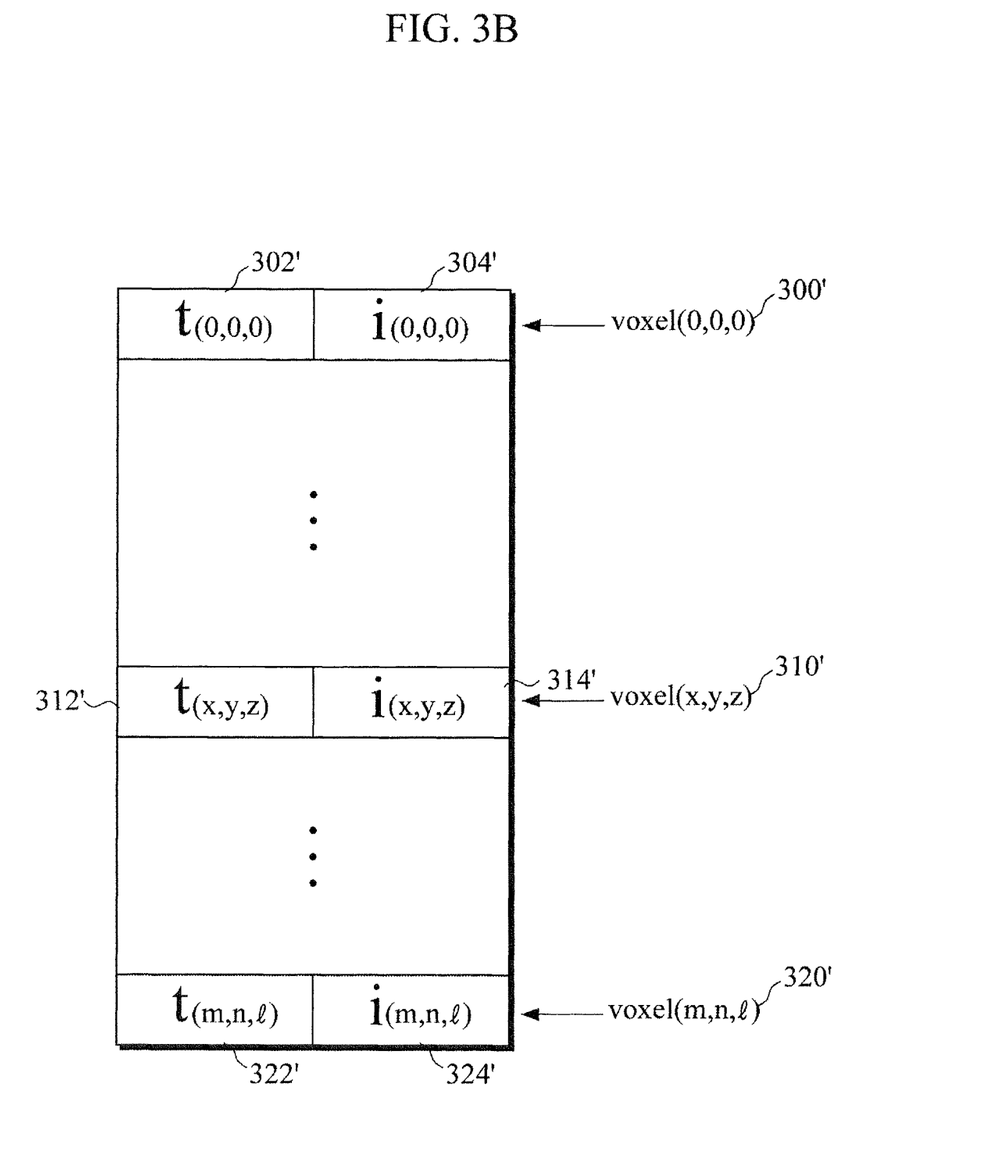
FIG. 3B is a diagram illustrating another example of the pixel flag according to an exemplary embodiment.

FIG. 3B is a diagram illustrating another example of the pixel flag.

In FIG. 3B, a voxel in a 3D object is a target of an operation, instead of a pixel in a 2D area.

Referring to FIG. 3B, the entire pixel area includes voxels arranged in a grid of (m+1)*(n+1)*(1+1) and coordinates of a target voxel, on which an operation is performed, are (x, y, z).

In the example shown in FIG. 3B, a pixel flag is two bits for each voxel like in the example shown in FIG. 3A. A first bit 302', 312', and 322' of each pixel flag represents a test bit value that indicates whether a corresponding voxel 300', 310', and 320' has been tested to determine whether it is included in a region of a seed voxel. A second bit 304', 314', and 324' represents an inclusion bit value that indicates whether the tested pixel is included in the region of the seed pixel.

In the example shown in FIGS. 3A and 3B, all bit values in the pixel flags may be initially set to 0 as a default value. By doing so, writing bit value 0 in the pixel flag may be omitted and writing bit value 1 in corresponding pixel flags are only needed. Accordingly, the overall performance speed of the system can be increased.

Even when a number of cores attempt to simultaneously write to a pixel flag associated with the same pixel, since both the test bit value and the inclusion bit value change only from 0 to 1, erroneous operation due to wrong data does not occur.

A group of pixels with 1 as an inclusion bit value which is obtained by completing the operation may be a desired region to be extracted.

Figure 4:
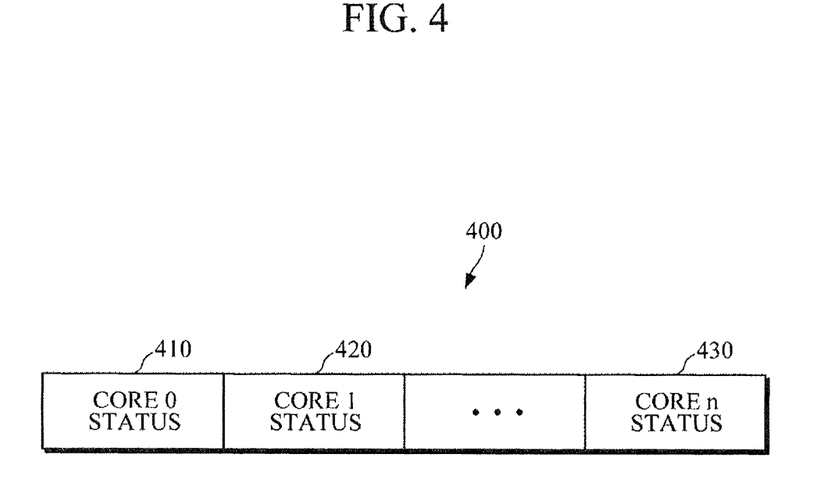
FIG. 4 is a diagram illustrating an example of a core flag according to an exemplary embodiment.

FIG. 4 is a diagram illustrating an example of a core flag.

In the core flag write area 200 in the shared memory 20, each core writes a core flag to indicate its core operation state.

Each core may be allowed to end the operation when all cores are in idle state. To terminate the operation, each core should be able to know the other cores' operation states. To indicate the operation state of each core, core flags are stored in the shared memory 20 that is available for all cores to access.

The core flag indicates whether each core is in idle state or active state, and the core flag associated with the core may be one bit. In the example illustrated in FIG. 4, a region growing apparatus includes n cores, and hence the core flag may be implemented by a variable 400 in length of n bits.

According to predefined settings, operation state value 0 or 1 in each core flag may represent idle state or active state of a corresponding core.

For example, 0 as a value of core 0 status 410, 0 as a value of core 1 status 420, and 1 as a value of core n status 430 may indicate that core 0 and core 1 are in idle state and core n is in active state.

When the state values are all zeroes, it indicates that all cores are in idle state, in which they do not work. In this state, it may be regarded that all operations for region growing are completed, and hence the cores are able to switch from idle state to end state.

Figure 5:
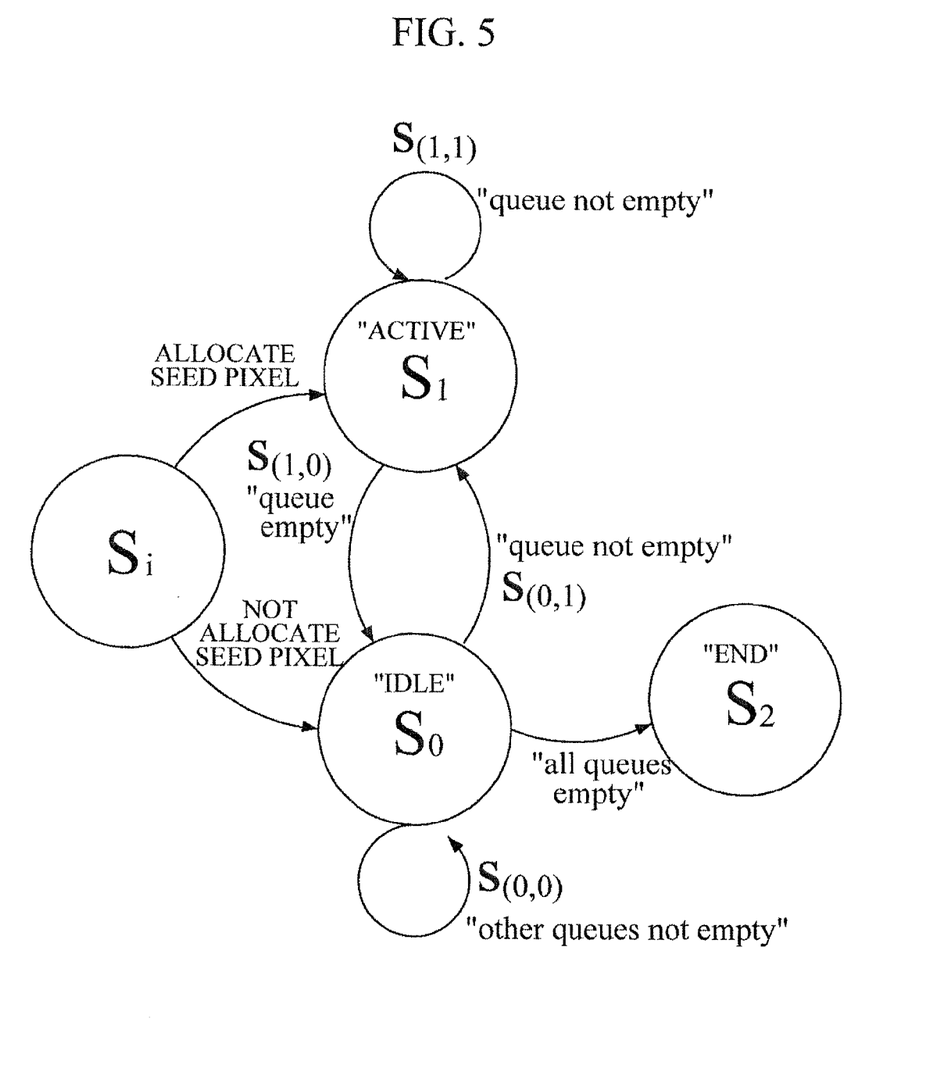
FIG. 5 is a state diagram illustrating states of cores in a region growing apparatus using a multi-core according to an exemplary embodiment.

FIG. 5 is a state diagram illustrating states of cores in a region growing apparatus using a multi-core.

Each core in the region growing apparatus may be in one of states including active state $S_1$, idle state $S_0$ or end state $S_2$.

An initial state of a core is determined between active state $S_1$ and idle state $S_0$ according to the allocation of a seed pixel to the core.

In $S_{(0,0)}$, a core in active state $S_1$ repeatedly performs an operation to determine whether neighboring pixels of at least one seed pixel stored in a queue are included in a region of the seed pixel, until the core queue is empty.

When the queue of a core in active state becomes empty, the core enters into idle state.

In response to a job related to a new seed pixel being input to a core in idle state, the core changes to active state in $S_{(1,0)}$.

In the meantime, when a core in idle state confirms that the other cores are in idle state, the core determines that region growing process has been completed, and then enters into end state $S_2$.

Figure 6:
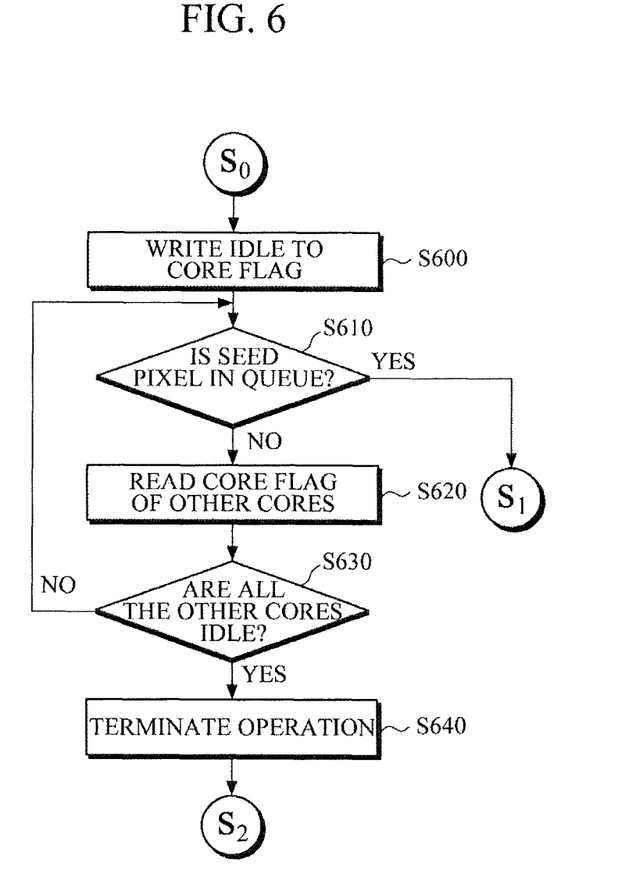
FIG. 6 is a flowchart illustrating an example of operations of a core in idle state according to an exemplary embodiment.

FIG. 6 is a flowchart illustrating an example of operations of a core in idle state.

A core in idle state writes its own operation state as idle to a core flag in operation S600.

Then, the core determines the existence of a seed pixel in a queue in operation S610.

If a new seed pixel is input to the queue from another core after operation S600, the core switches to active state ($S_1$). Otherwise, the core reads out a core flag of the other core with reference to a core flag write area of a shared memory 20, in operation S620.

In operation S630, it is determined whether all of the cores are in idle state. In this case, the given core determines that region growing process has been completed, and enters into end state $S_2$.

If only some cores are in idle state, the process is iterated from operation S610.

Figure 7:
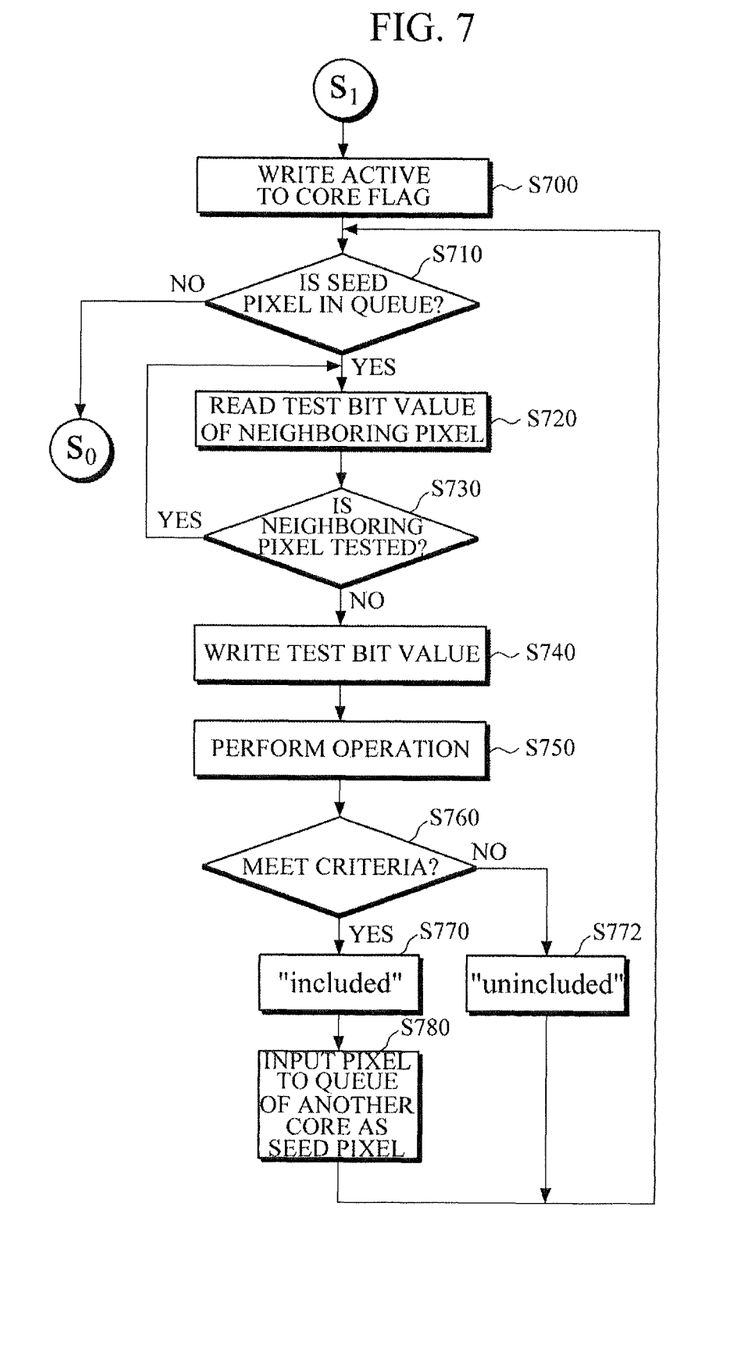
FIG. 7 is a flowchart illustrating an example of operations of a core in active state according to an exemplary embodiment.

FIG. 7 is a flowchart illustrating an example of operations of a core in active state.

A core in active state writes the operation state as active to a core flag in operation S700.

A lock process may be used in some cases since a number of cores may attempt to simultaneously access the core flag.

Thereafter, the core determines the existence or absence of a seed pixel in a queue, in operation S710.

If there is a seed pixel in the queue, the core reads a test bit value associated with a neighborhood pixel of the seed pixel from a pixel flag write area 200 of a shared memory 20 in operation S720.

If the neighboring pixel has been tested (operation S730), operation S720 is repeated on another neighborhood pixel of the seed pixel. If the neighboring pixel has not been tested, the core changes the test bit value to, for example, 1 to indicate that the test on the pixel is being performed or completed, in operation S740. Then, the core performs an operation for determining whether the neighboring pixel is included in a region of the seed pixel, in operation S750, and determines whether a property value of the neighboring pixel meets region inclusion criteria, in operation S760.

If the neighboring pixel meets the criteria, the core writes a bit value, for example, 1 to a pixel flag of the neighboring pixel to indicate that the neighboring pixel is included in the region of the seed pixel, in operation S770. For example, the neighboring pixel becomes a new seed pixel, and thus the core may input the new seed pixel to a queue of another core, in operation S780.

On the contrary, if the neighboring pixel does not meet the criteria, the core writes a bit value, for example, 0 to the pixel flag to indicate that the neighboring pixel is not included in the region of the seed pixel, in operation S772. However, if the initial values of the flags have been set to 0, operation S772 may be omitted.

Since each seed pixel has several neighboring pixels, operations S720 to S780 are repeatedly performed for each neighboring pixel, and thereafter the core performs operation S710.

If a new seed pixel still remains in the core's queue, the core performs operations S720 to S780 on the new seed pixel. However, if a result of operation S710 shows that there is no remaining new seed pixel in the queue, the core enters into idle state $S_0$.

Figure 8:
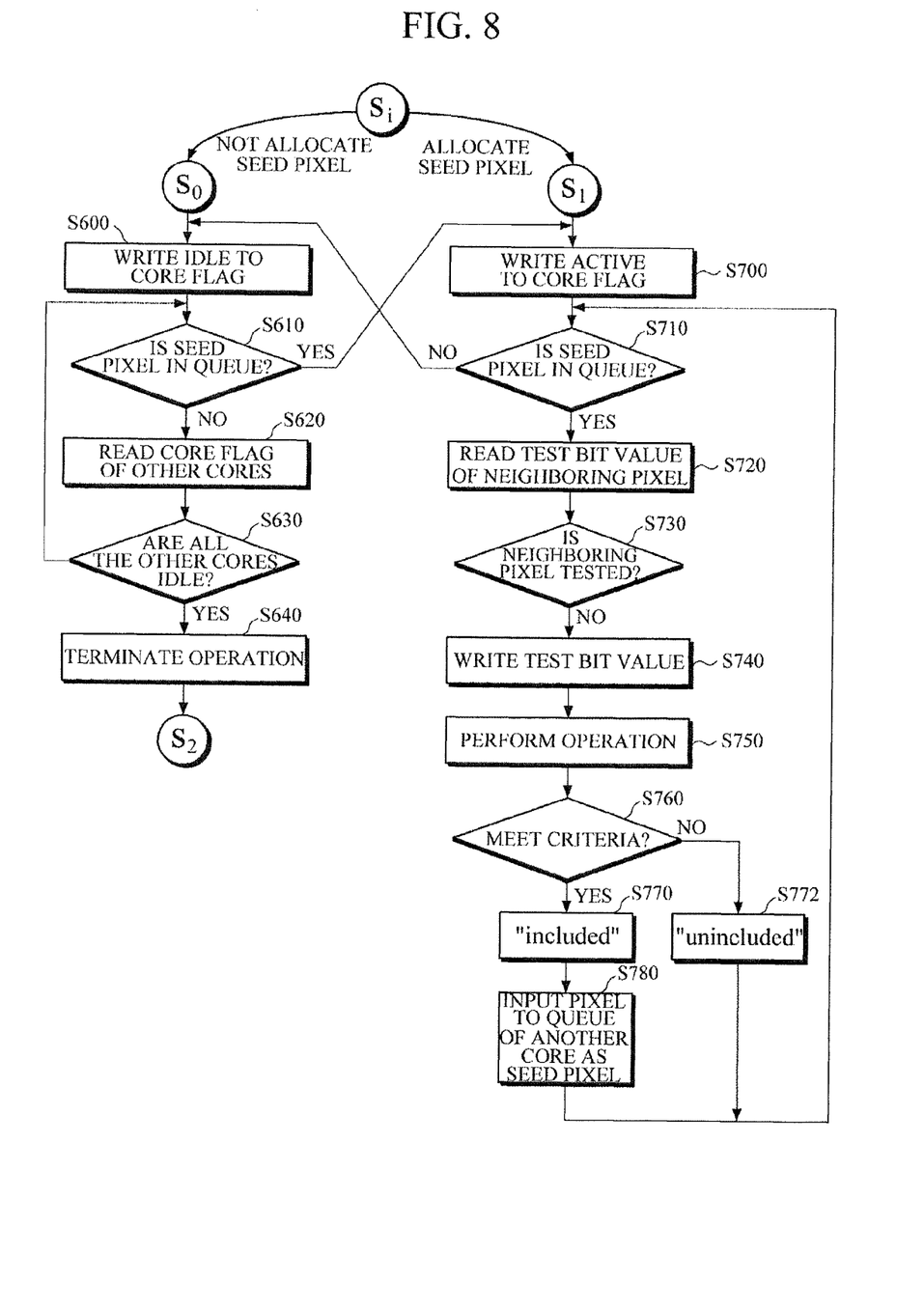
FIG. 8 is a flowchart illustrating a region growing method performed by a core according to an exemplary embodiment.

FIG. 8 is a flowchart illustrating a region growing method performed by a core.

The flowchart shown in FIG. 8 is combined from the flowcharts shown in FIG. 6 and FIG. 7.

A core with a queue in which a seed pixel is not initially stored starts region-growing in idle state $S_0$. A core with a queue in which a seed pixel is initially stored starts region-growing in active state $S_1$. In response to a new seed pixel being input to the queue from another core or all seed pixels present in the queue being completely processed, an operation state of the core switches between idle state and active state. Upon all of cores entering into idle state, it is determined that the region growing process has been completed, and each core is switched to end state.

FIGS. 9A to 9D are diagrams illustrating examples of region growing processes in a region growing apparatus using 16 cores. The examples shown in FIGS. 9A to 9D assume that each seed pixel has four neighboring pixels.

Figure 9A:
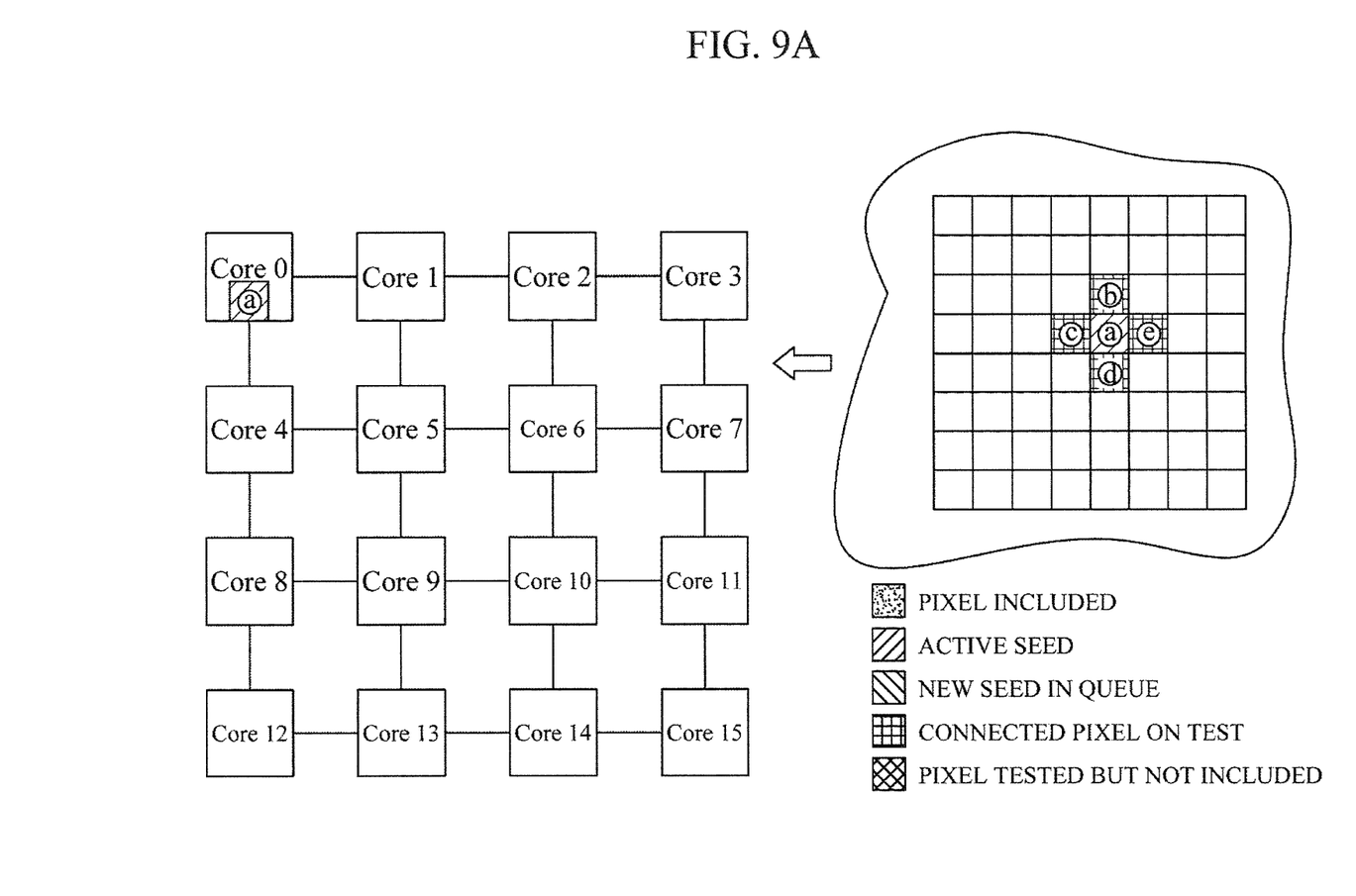
FIGS. 9A, 9B, 9C, and 9D are diagrams illustrating examples of region growing processes in a region growing apparatus according to an exemplary embodiment.

Referring to FIG. 9A, an initial seed pixel a is stored in a queue of core 0. Neighboring pixels b, c, d, and e of the initial seed pixel a are target pixels for the core 0 to perform an operation on.

Figure 9B:
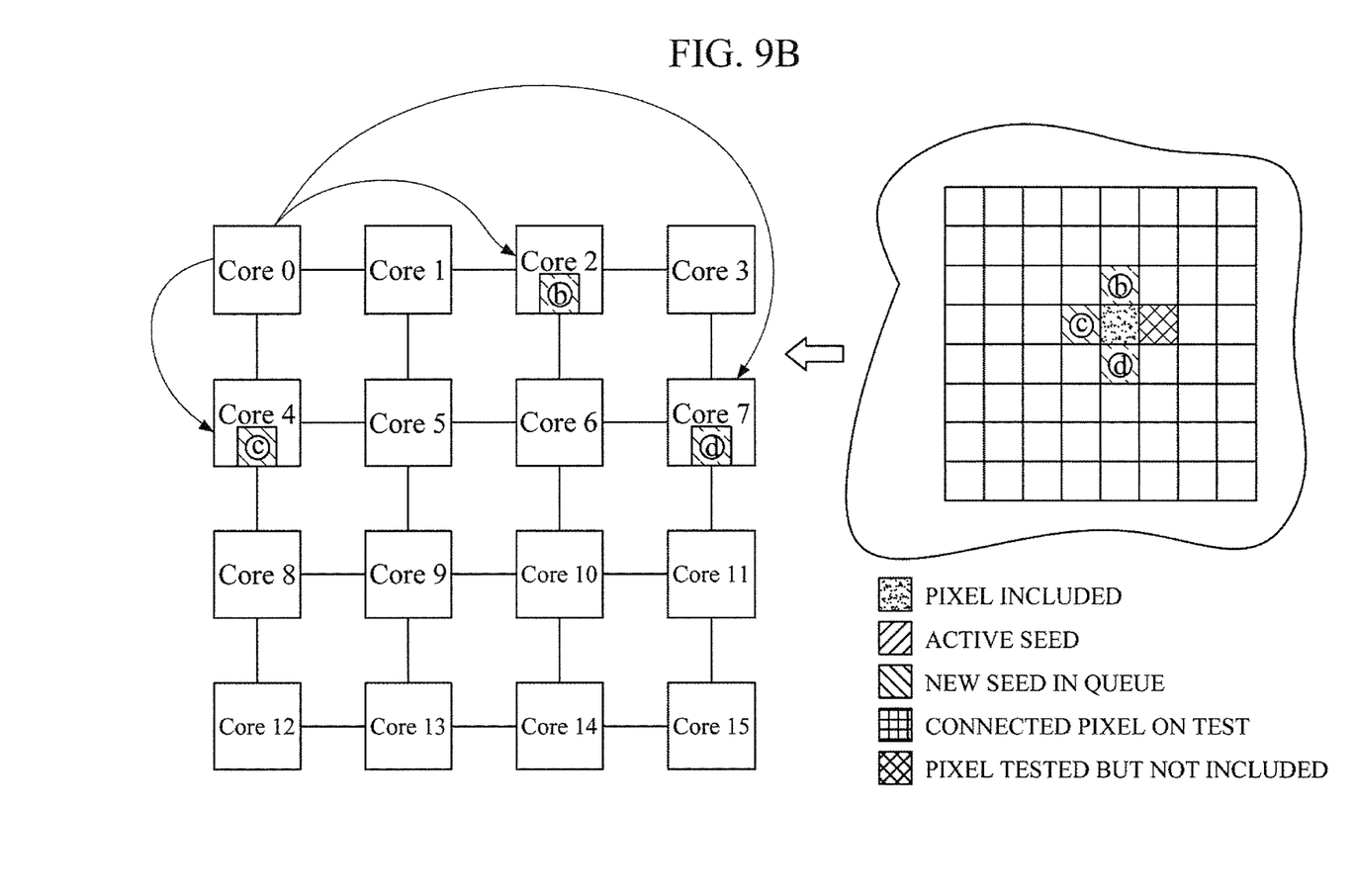

Referring to FIG. 9B, a job related to a new seed pixel is distributed to another core after the core 0 completes a test for the target pixels b, c, d, and e. The job related to the new seed pixel may be stored in the queue of the core 0, but for efficiency improvement, it may be appropriate to distribute the job to another core.

Different scheduling schemes may apply to the job distribution with consideration of the number of cores and network topology.

The example shown in FIG. 9B assumes that the core 0 inputs a job related to the neighboring pixels b, c, and d to queues of core 2, core 4 and core 7, respectively.

A queue of each core is available for other cores to access and a lock process may be performed when several cores attempt to access the same queue of the same core at the same time. In the example shown in FIG. 9C, the core 0 to transfer the job to a queue of the core 2 may perform lock process to obtain an exclusive access to the queue, and thereby be able to input the job to the queue of the core 2, and when the input of the job is completed, release the lock.

Figure 9C:
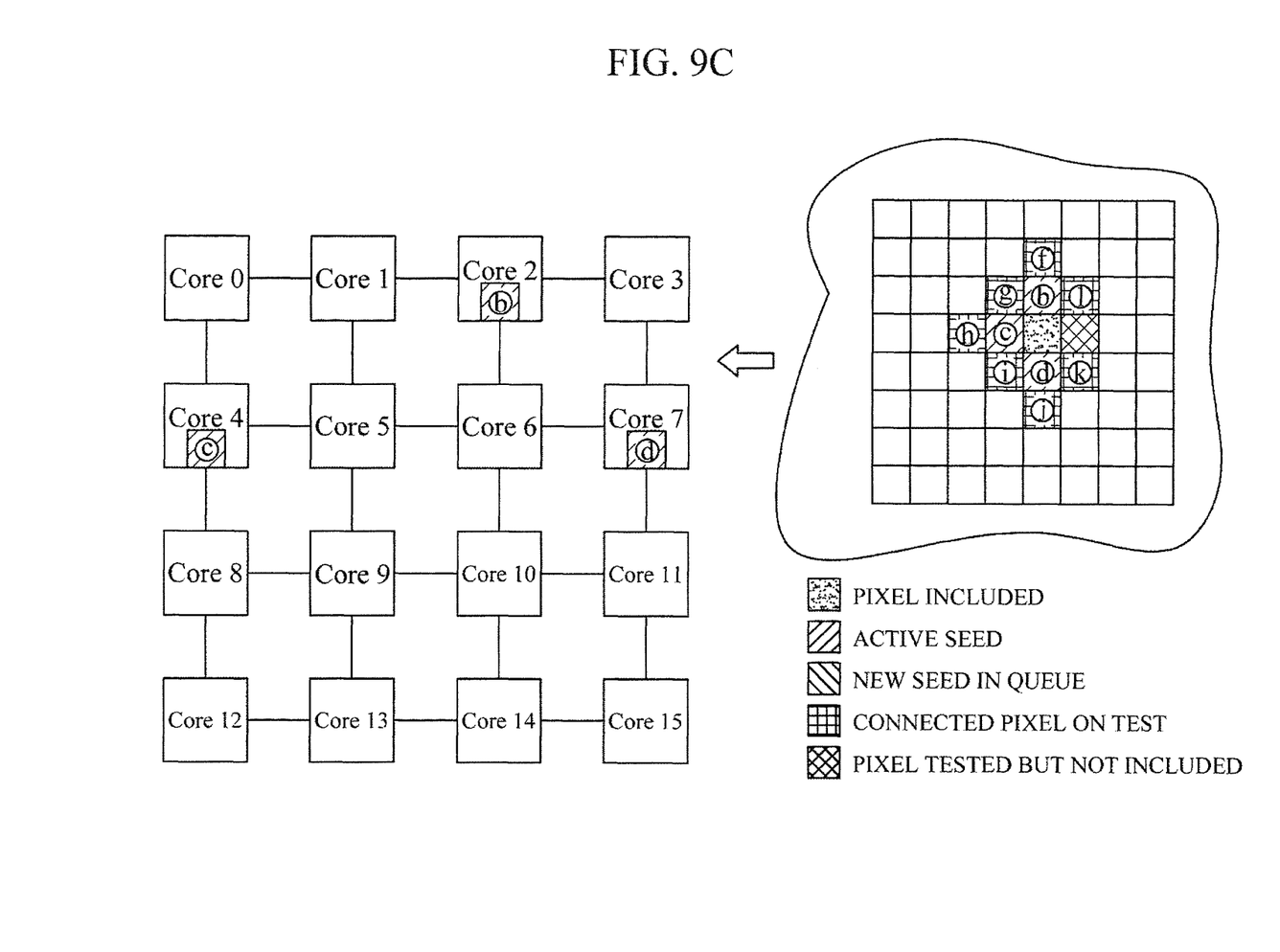

In the meantime, pixel e is determined as being un-included in the region of the initial seed pixel, and hence only a test bit value of a corresponding pixel flag is changed to, for example, 1 to indicate the completion of a test.

In the example shown in FIG. 9C, the core 2, core 4, and core 7 have pixels b, c, and d as their new seed pixels, respectively. Then, pixels f, g, h, i, j, k and l become targets of the operation. The operation is not performed on those pixels among the target pixels f, g, h, I, j, k, and l which are determined as having already been tested or being included in a region of a corresponding seed pixel, with reference to associated pixel flags.

Pixel g neighbors with pixel b and pixel c. Among core 2 and core 4, the core that accesses pixel g earlier than the other has a process authority. This may be implemented by testing pixel g only when an associated test flag bit is, for example, 0 which is referred to by the core before performing the test.

Figure 9D:
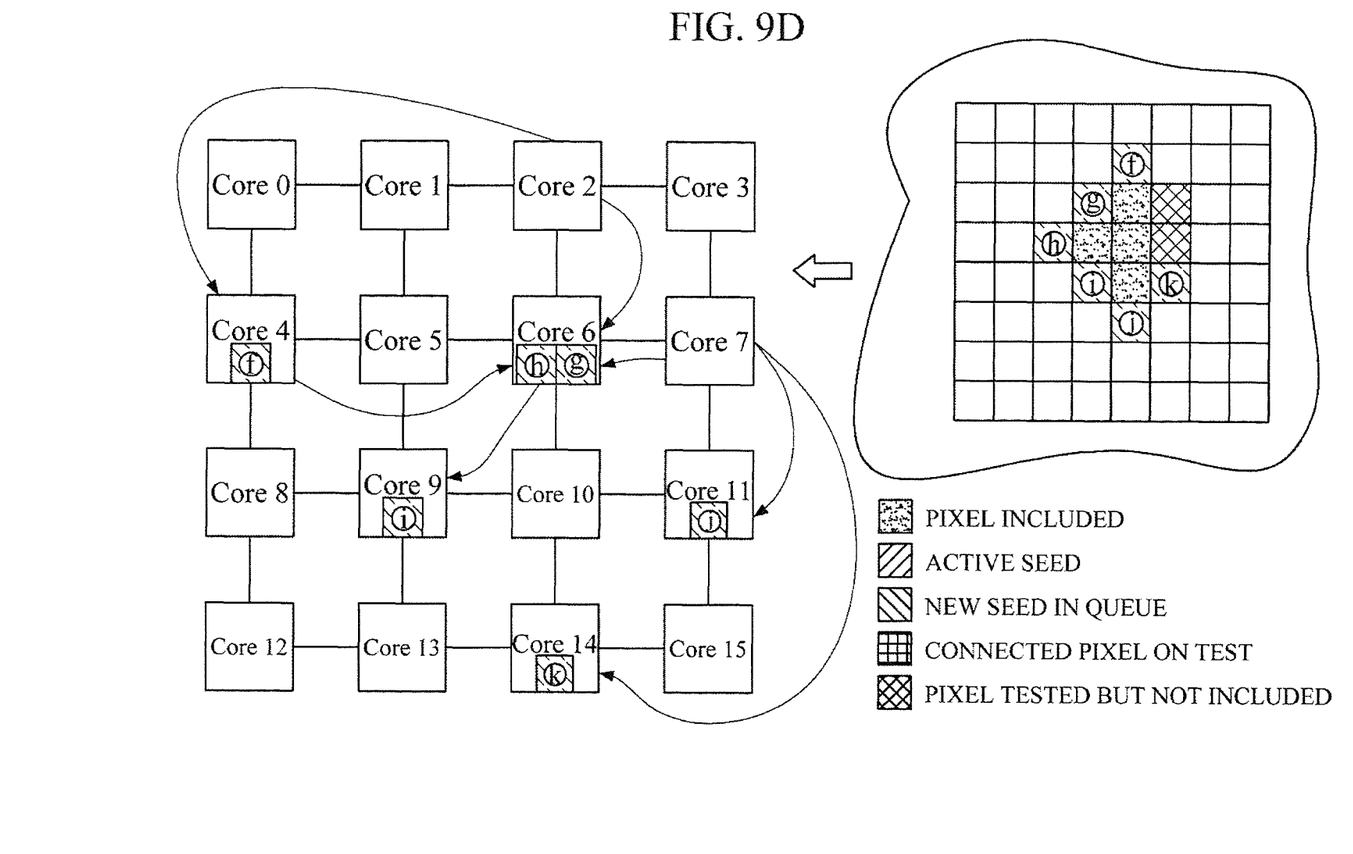

The example shown in FIG. 9D illustrates core 2, core 4, and core 7 that have finished tests on pixels b, c, and d, respectively. A test result from core 4 shows that neighboring pixel h of the seed pixel c is included in the corresponding region, and the core 4 transmits the result to core 6. Core 7 has a test result showing that each of the neighboring pixels i, j, and k are included in a corresponding region, and transfers jobs related to the pixels i, j, and k to core 9, core 11 and core 14, respectively, which take the pixels as their seeds.

According to the above procedures, multiple cores are able to perform operations with few stages in parallel.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Although a few exemplary embodiments have been shown and described, exemplary embodiments are not limited thereto. It would be appreciated by those skilled in the art that changes may be made in these exemplary embodiments without departing from the principles and spirit of the disclosure, the scope of which is defined in the claims and their equivalents.

What is claimed is:

1. A region growing apparatus using multi-core, the region growing apparatus comprising:
    a plurality of cores, each core comprising an operation controller configured to perform an operation for region growing of a two-dimensional (2D) pixel region or three-dimensional (3D) pixel region and an inner memory configured to store a queue associated with a seed pixel as a target of the operation; and
    a shared memory connected to the plurality of cores over a network and shared by the plurality of cores.

2. The region growing apparatus of claim 1, wherein the shared memory comprises:
    a core flag write area, to which a core flag is written to indicate an operation state of each of the plurality of cores; and a pixel flag write area, to which a pixel flag is written to indicate a processing state of individual pixels included in the pixel region.

3. The region growing apparatus of claim 2, wherein each of the plurality of cores comprises a core flag writer configured to write a core flag value to the core flag write area, corresponding to an operation state of a corresponding core.

4. The region growing apparatus of claim 3, wherein the operation state is an active state or an idle state.

5. The region growing apparatus of claim 3, wherein the core flag value is 1 which corresponds to an active state of the core or 0 which corresponds to an idle state of the core.

6. The region growing apparatus of claim 2, wherein each of the plurality of cores comprises a pixel flag writer configured to write the pixel flag for each of the plurality of cores to the pixel flag write area.

7. The region growing apparatus of claim 6, wherein the pixel flag includes:
 a test bit value which indicates whether a pixel associated with the pixel flag is processed; and
 an inclusion bit value which indicates whether the pixel meets region inclusion criteria of the operation for region growing.

8. The region growing apparatus of claim 7, wherein the pixel flag writer of each of the plurality of cores is configured to set the test bit value of the pixel flag associated with a neighboring pixel of a seed pixel as 1 when the neighboring pixel is processed; and
 the operation controller is configured to perform the operation for region growing on the neighboring pixel by determining whether the neighboring pixel is to be included into a region of the seed pixel.

9. The region growing apparatus of claim 8, wherein, when the pixel on which the operation for region growing has been performed is included in the region of the seed pixel, the pixel flag writer is configured to set the inclusion bit value of the pixel flag associated with the neighboring pixel as 1, and to input the neighboring pixel to a queue of another core as a new seed pixel.

10. The region growing apparatus of claim 4, wherein the plurality of cores end corresponding jobs in response to the operation state of all of the core flags in the core flag write area being idle.

11. The region growing apparatus of claim 9, wherein a group of pixels having 1 as an inclusion bit value becomes a result of the operation for region growing.

12. A region growing method using multi-core, the method comprising:

writing core flags to a core flag write area of a shared memory to indicate operation states of a plurality of cores, respectively;

determining whether an operation for region growing has been performed on a neighboring pixel of a seed pixel that is input to a queue of a core in an active state, based on a test bit value of a pixel flag associated with the neighboring pixel;

in response to a determination that the operation for region growing has not been performed on the neighboring pixel, changing the test bit value associated with the neighboring pixel;

performing the operation for region growing to determine whether the neighboring pixel is included in a region of the seed pixel; and writing a result of the operation for region growing to an inclusion bit value of the pixel flag associated with the neighboring pixel.

13. The region growing method of claim 12, wherein the test bit value and the inclusion bit value of the pixel flag are written to a pixel flag write area of the shared memory.

14. The region growing method of claim 13, wherein the writing the test bit value and the inclusion bit value comprises:
 writing 1 to the inclusion bit value associated with the neighboring pixel and inputting the neighboring pixel to a queue of another core, when the operation for region growing has been performed on the neighboring pixel included in the region of the seed pixel.

15. The region growing method of claim 14, further comprising:
 inputting the neighboring pixel to a queue of another core as a new seed pixel.

16. The region growing method of claim 15, further comprising:
 changing a value of an operation state of a core flag associated with the core to a value corresponding to an idle state when the operation for region growing is completed on neighboring pixels of all of seed pixels input to the queue of the core.

17. The region growing method of claim 16, further comprising:
 terminating a job of the core, in response to operation states of all other cores being determined as the idle state with reference to the core flag write area.

18. The region growing method of claim 14, further comprising:
 outputting a group of pixels having 1 as inclusion bit values as a result of the operation for region growing.

* * * * *